United States Patent Office 3,102,187
Patented Aug. 27, 1963

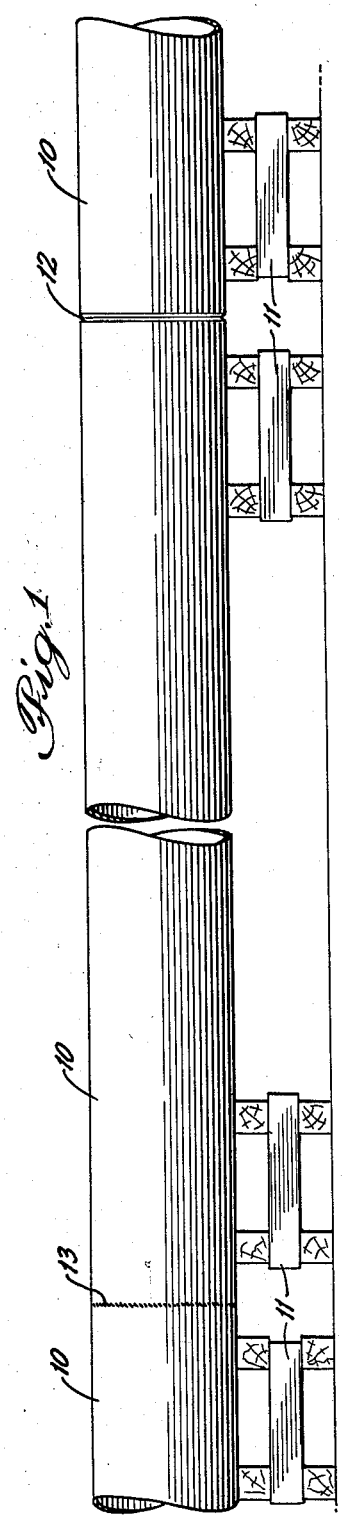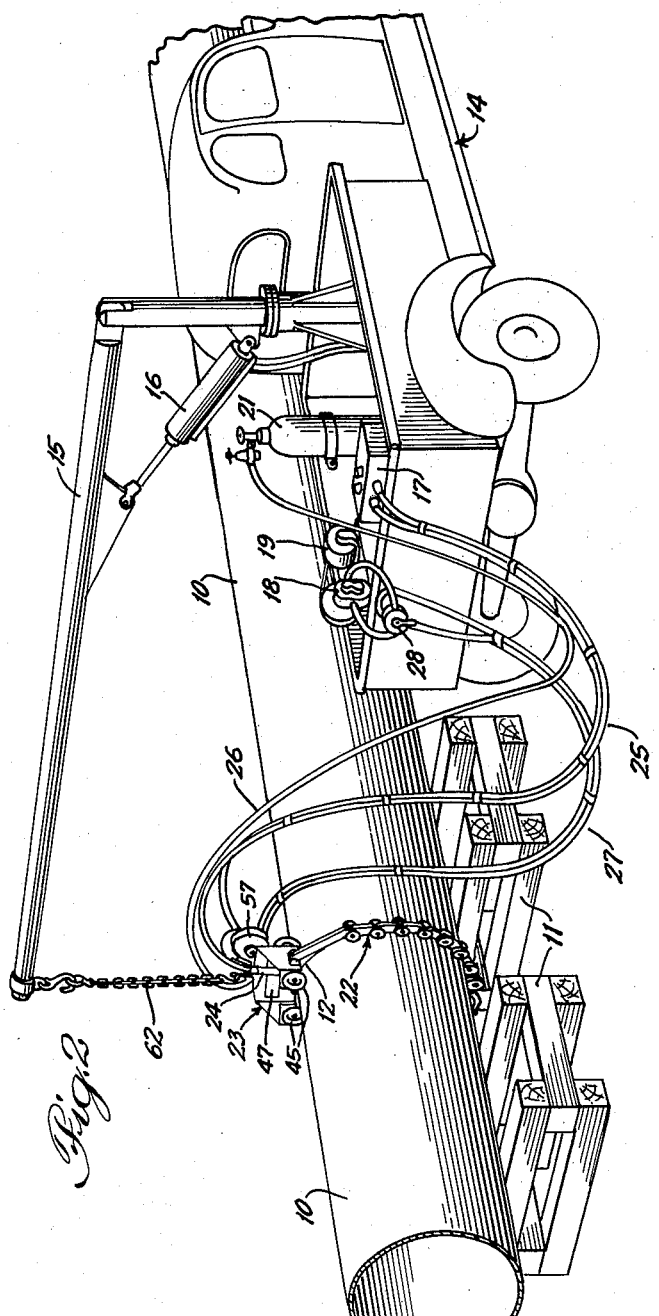

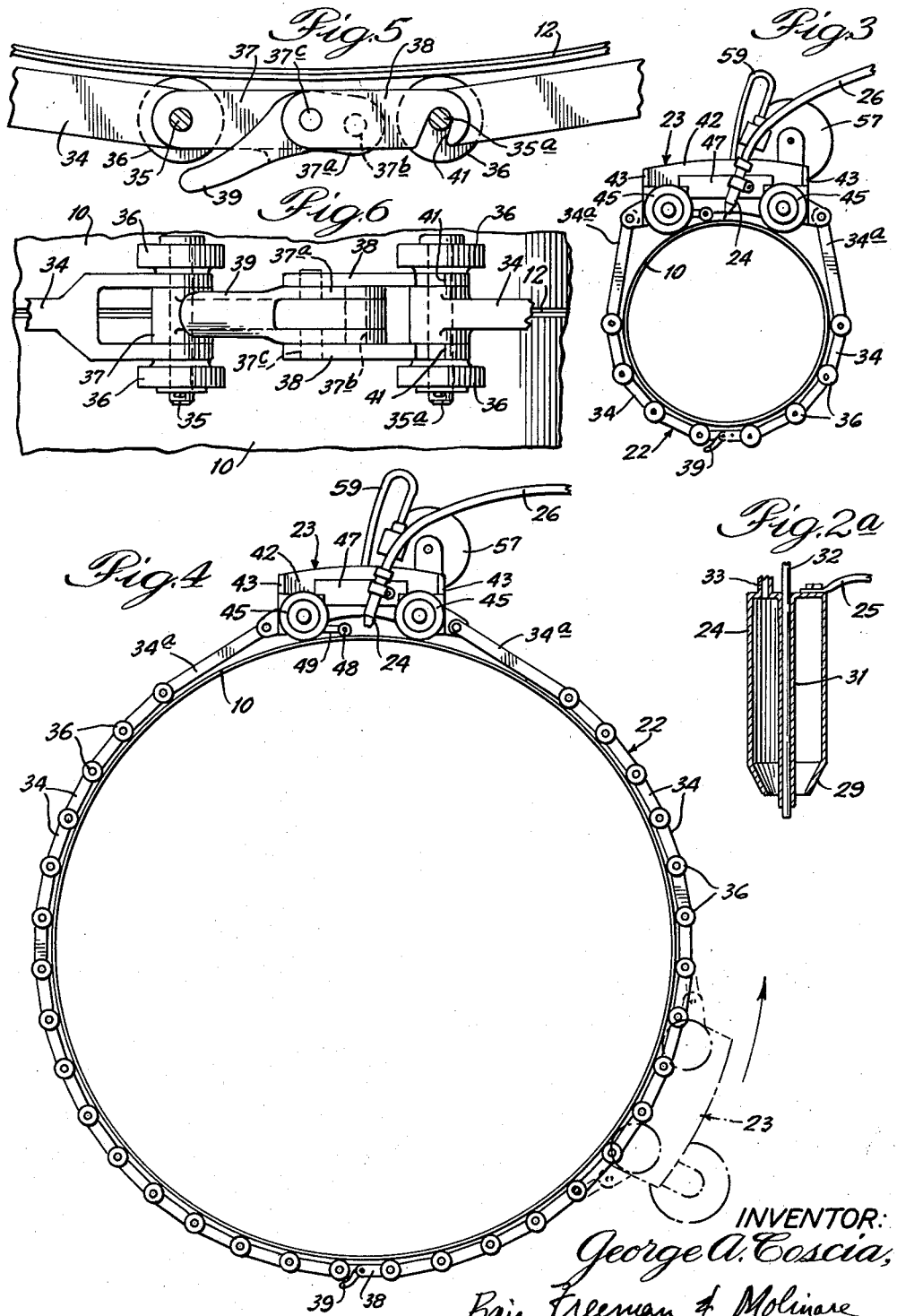

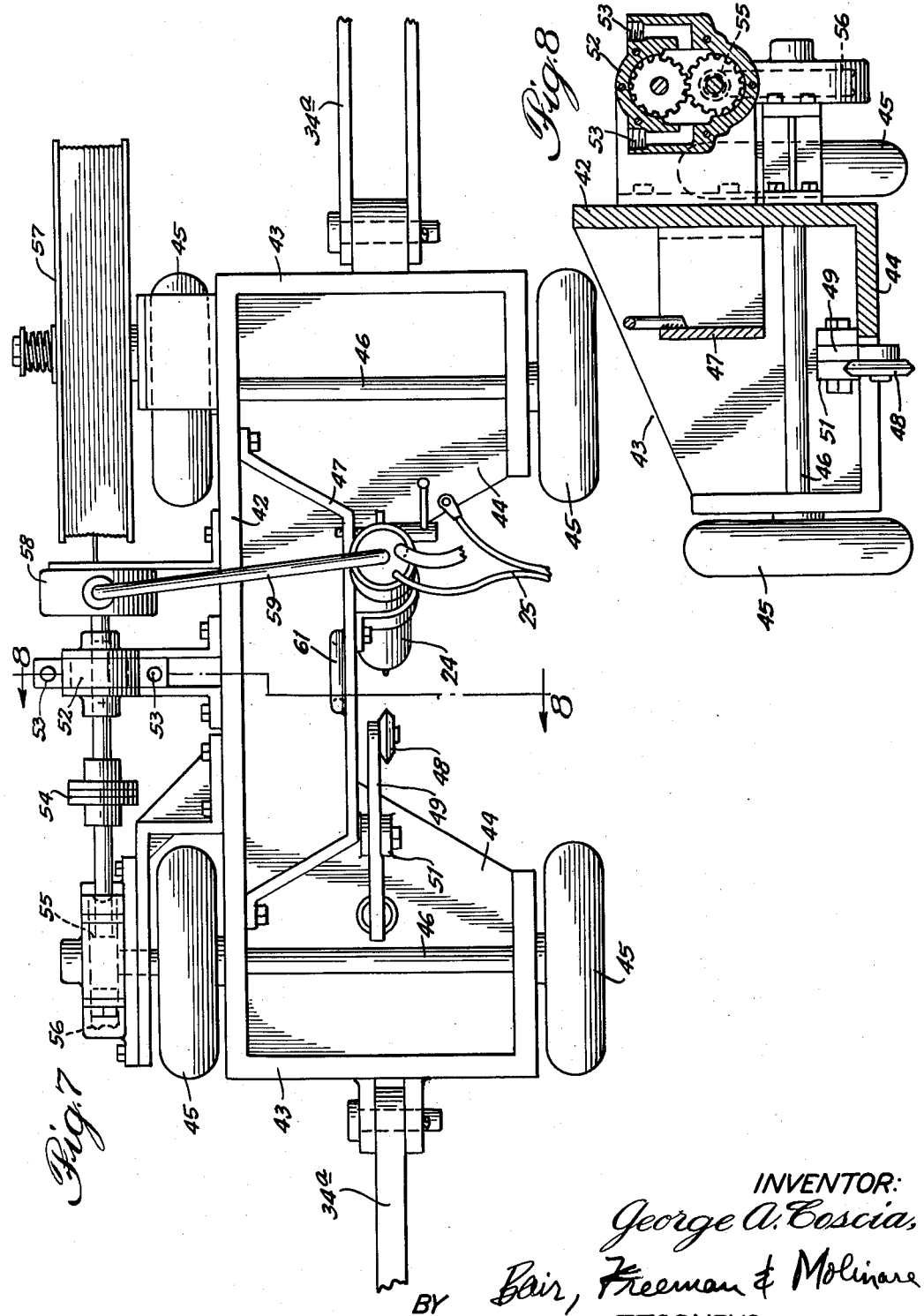

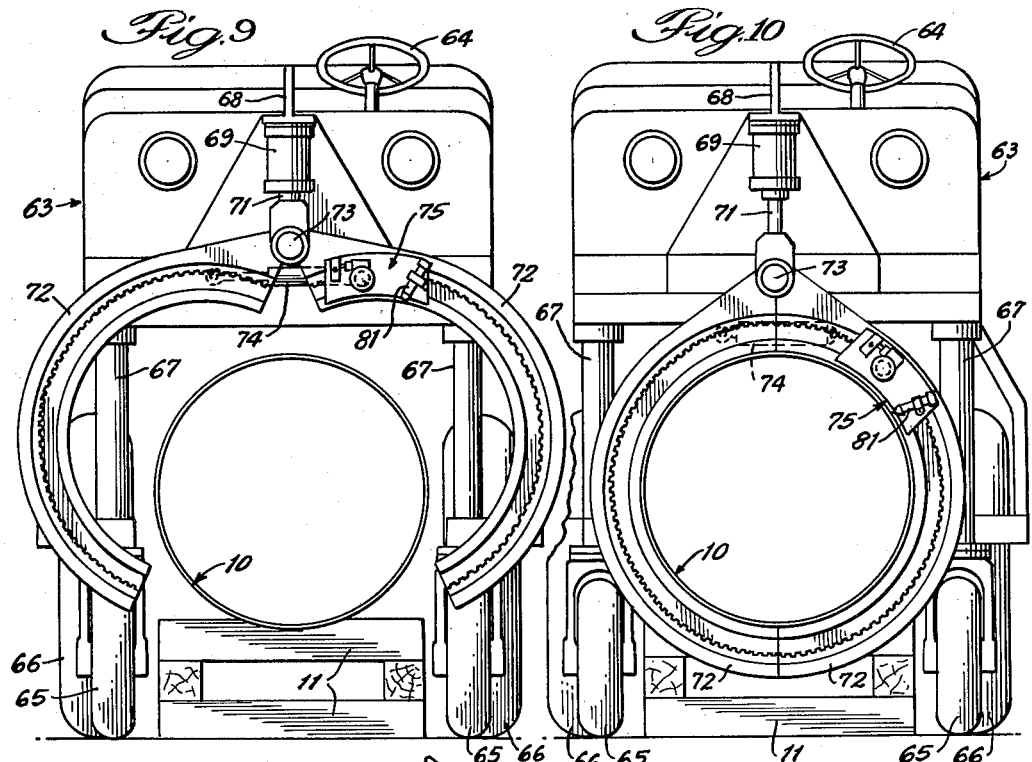
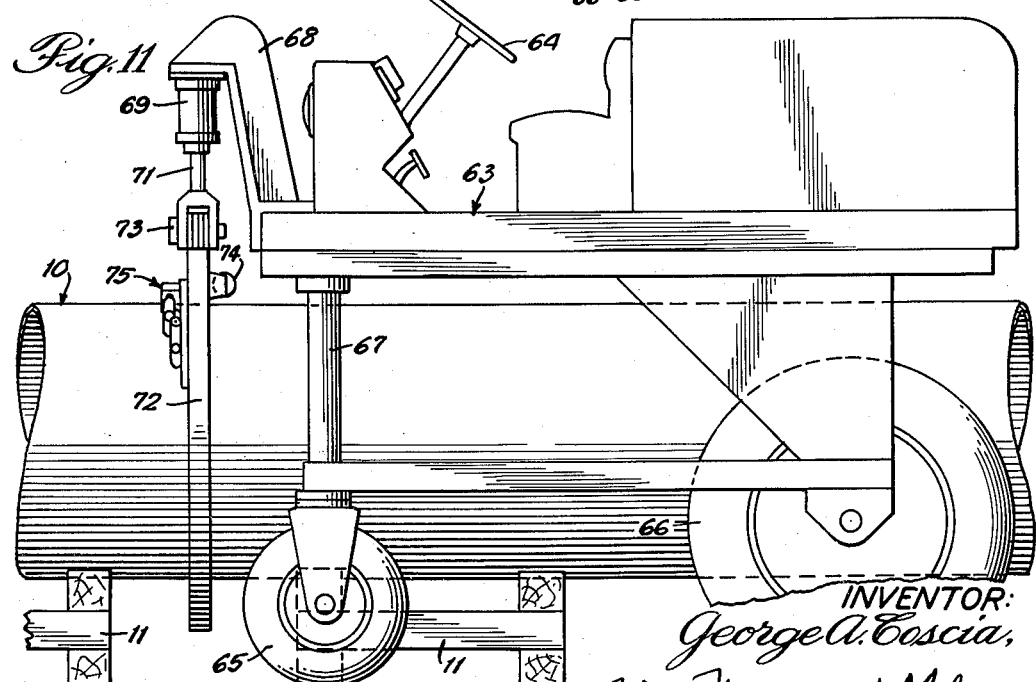

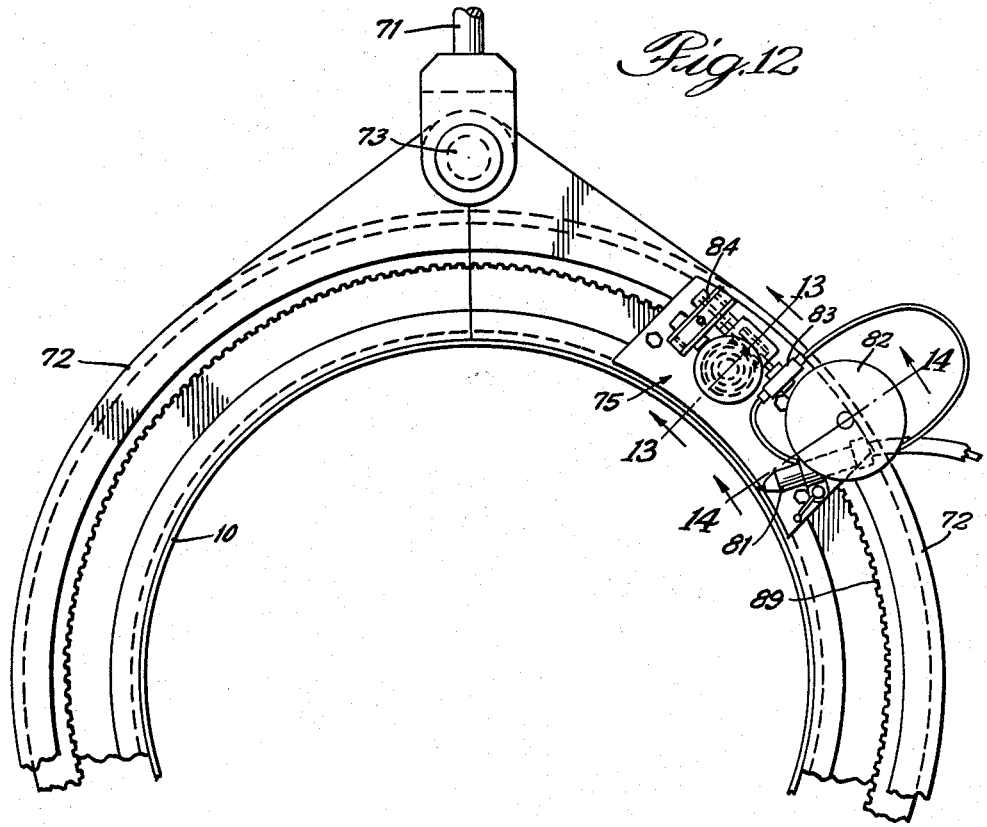
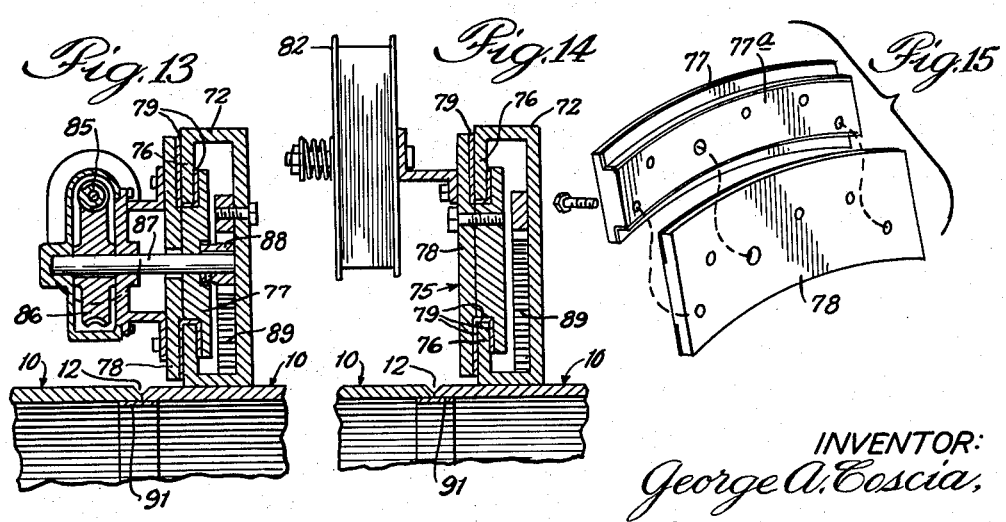

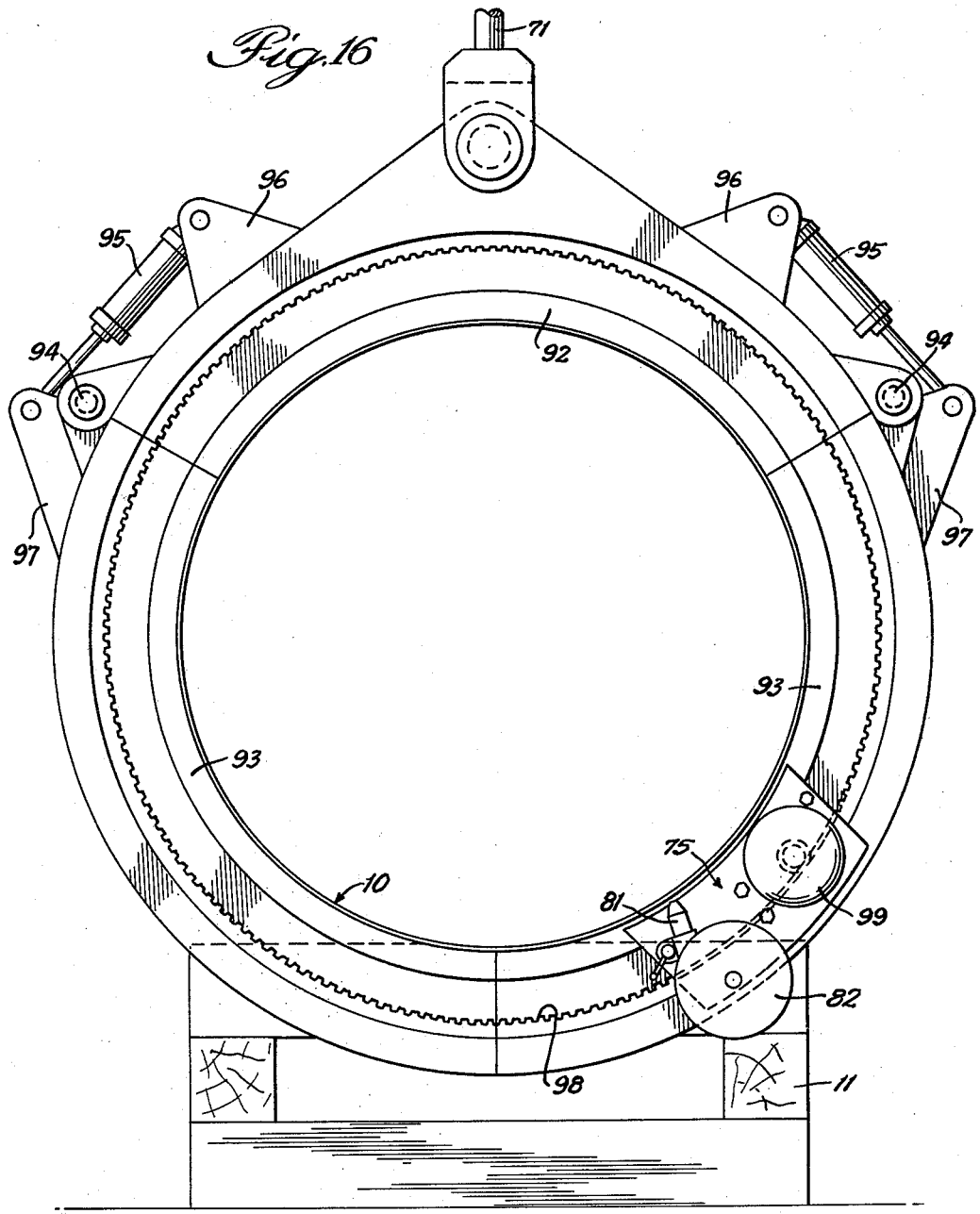

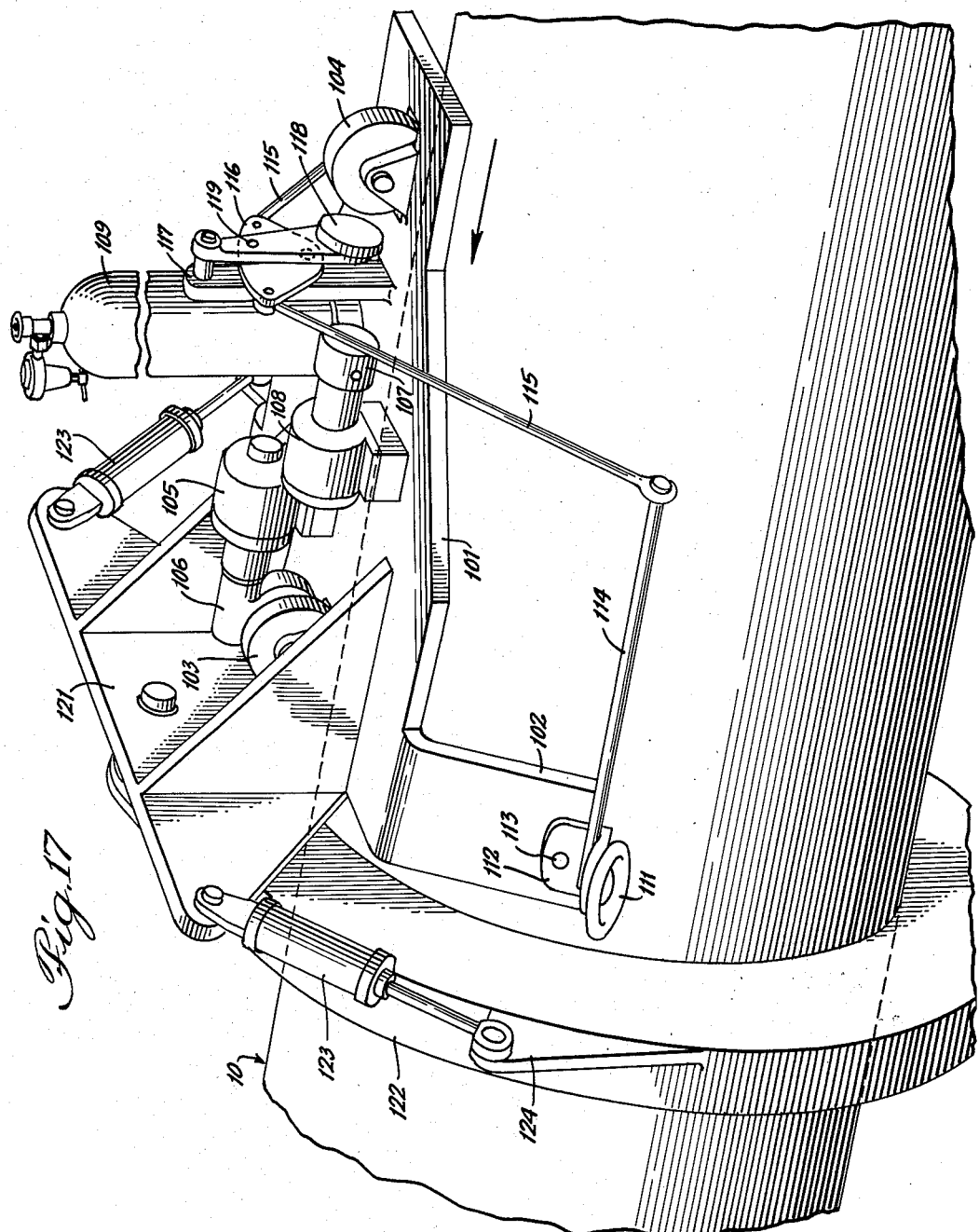

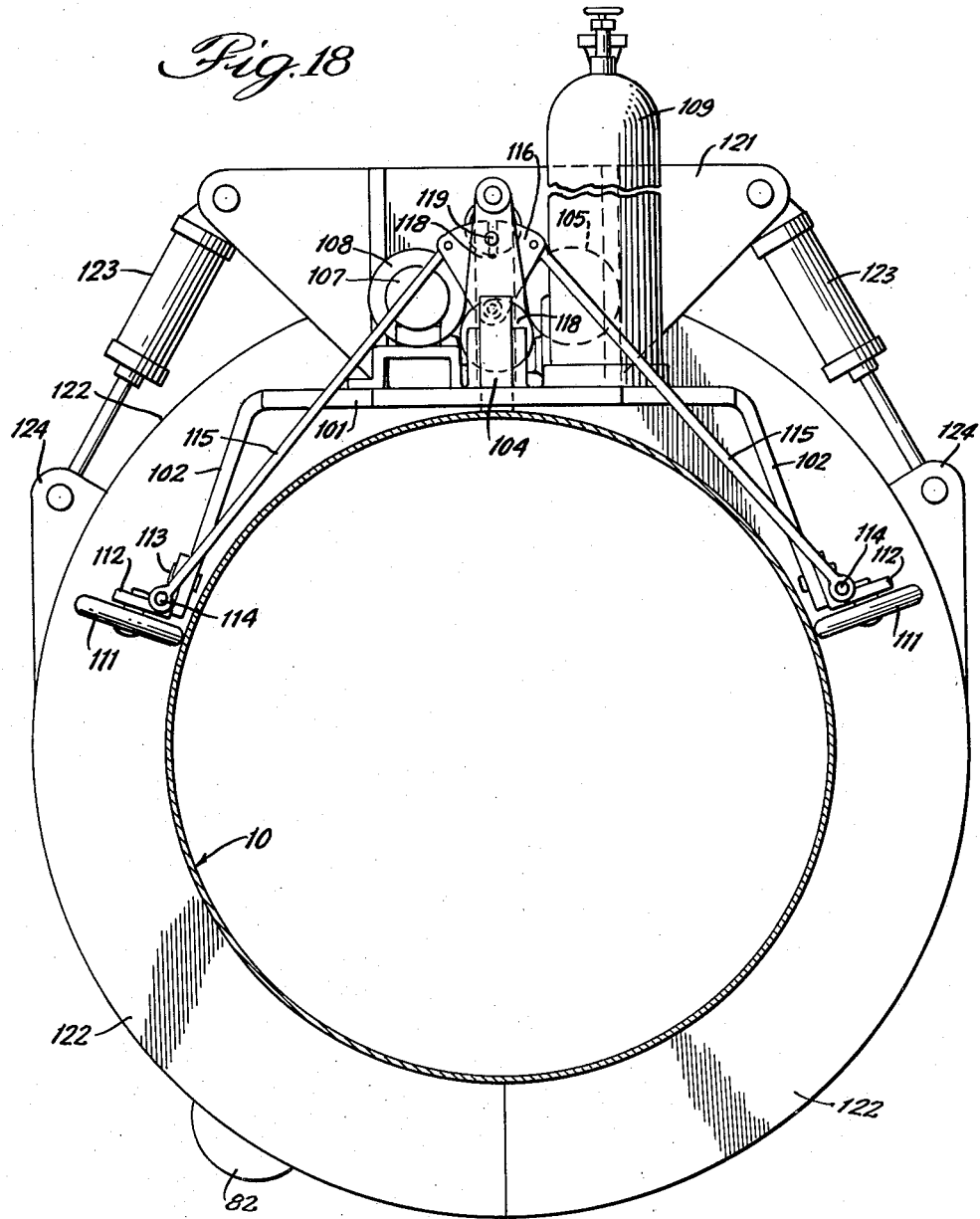

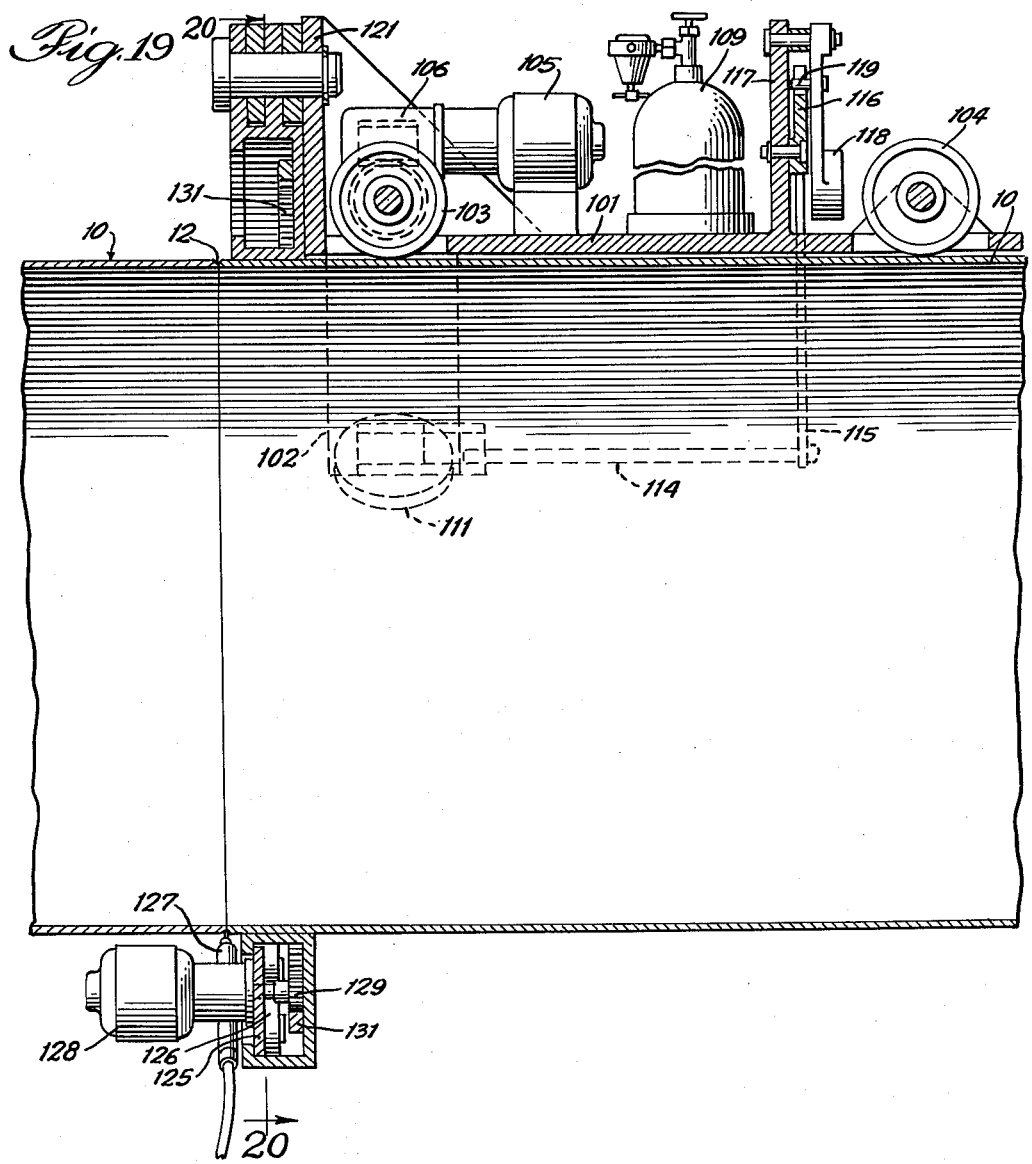

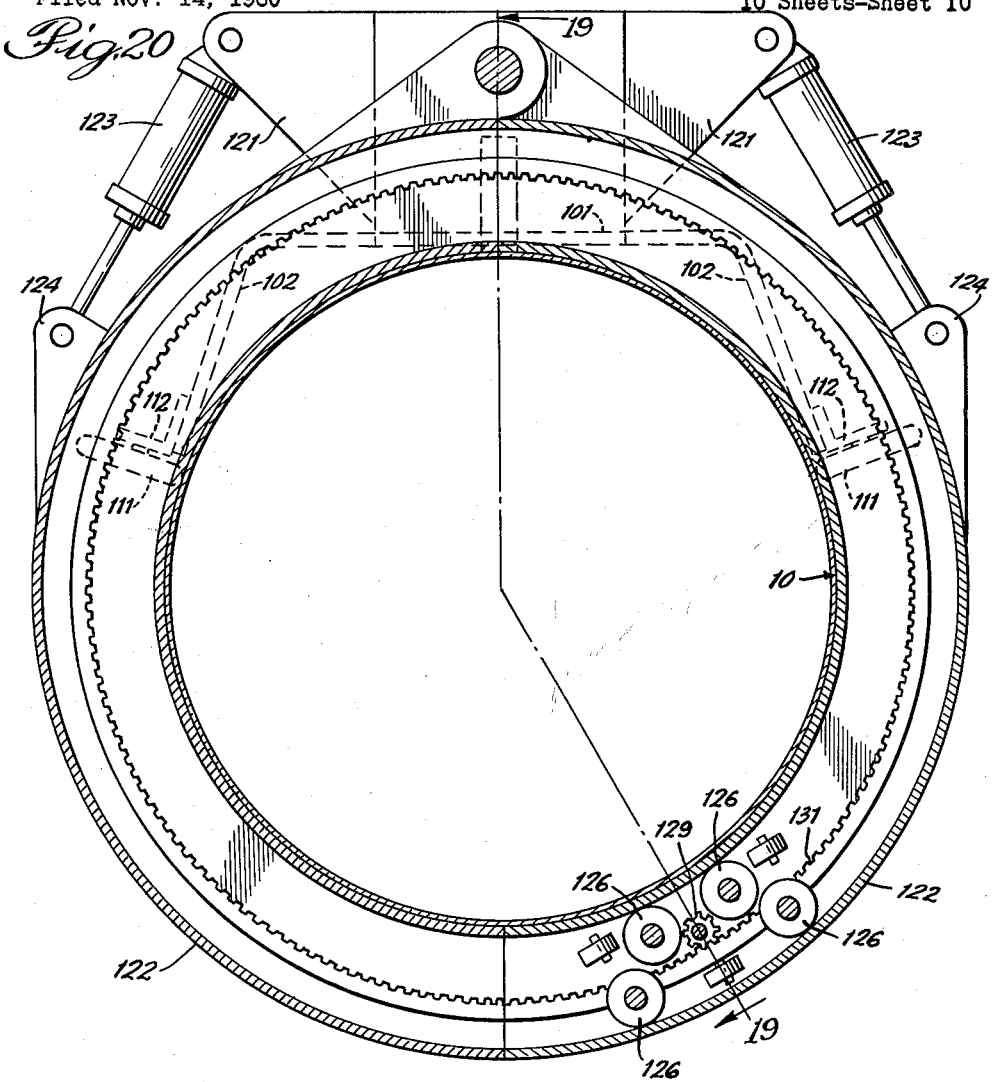

3,102,187
APPARATUS FOR WELDING PIPES
George A. Coscia, 48 Park Circle, Eggertsville, N.Y.
Filed Nov. 14, 1960, Ser. No. 69,025
14 Claims. (Cl. 219—60)

This invention relates to apparatus for welding pipes and more particularly to apparatus for welding pipe sections together in end-to-end relationship while the pipes are in position in a pipe laying operation.

In a conventional operation of laying pipe lines, pipe sections are aligned end-to-end on pallets or shoring, generally beside the ditch in which the pipe is to be buried, and the sections are welded together. Thereafter the joints, or the entire pipe where it is not pre-cut, are covered with a corrosion resistant coating and the pipe string is placed in the ditch and covered.

The pipe sections are generally handled by tractors having beams thereon which pick up the sections and place them in position on the pallets or shoring in end-to-end relationship. This part of the operation, as well as the ditch and covering which are performed by machines, is performed efficiently and can be carried out at a relatively high rate of speed. The welding, however, has heretofore been done by hand and is slow and expensive, the welding of a single joint on large pipe, such as 108 inch diameter pipe, commonly requiring six hours or more for two welders. Thus the welding not only comprises a costly portion of the laying operation, but is the bottleneck which determines the rate at which the operation can proceed.

It is accordingly one of the objects of the present invention to provide apparatus for welding pipe which operates rapidly and substantially automatically to weld the joints between the pipe sections in position during a pipe laying operation.

Another object is to provide apparatus for welding pipe in which the welding gun is mounted on a carriage driven around the pipe at a joint between sections to weld the joint.

According to a feature of the invention, the welding gun is supplied with welding rod and with an inert gas which discharges around the rod to blanket the area being welded. With this construction, the gun can weld at any angle to the work and it is practical to carry the gun completely around stationary pipe sections to form a weld around the full circumference.

According to another feature of the invention the carriage carries a supply of welding rod or wire together with feeding means to feed the welding rod to the gun, the feeding means being operated by the same power means which drives the carriage.

The invention may be embodied in various forms having different advantageous features according to which the carriage may be supported on the pipe by an annular flexible support which moves around the pipe with the carriage or by a sectional ring which remains stationary on the pipe while the carriage is traveling around it. The support, or ring, can be carried and handled by a crane or boom on a tractor, by a straddle truck, or by a self-propelled carriage riding on the pipe itself.

The above and other objects and features of the invention will be more readily apparent from the following description when read in connection with the accompanying drawings, in which:

FIGURE 1 is a side elevation illustrating a conventional assembly of pipe sections on pallets or shoring preliminary to welding;

FIGURE 2 is a perspective view illustrating a welding apparatus according to the invention applied to the pipe;

FIGURE 2a is a diagrammatic sectional view of a welding gun of the type employed in the invention;

FIGURE 3 is a sectional view through the pipe showing the welding apparatus thereon;

FIGURE 4 is a view similar to FIGURE 3 illustrating use of the apparatus on a pipe of larger diameter;

FIGURE 5 is an enlarged elevational view illustrating a releasable connection for the flexible support of FIGURES 2 to 4;

FIGURE 6 is a partial view looking from the bottom in FIGURE 5;

FIGURE 7 is an enlarged top view of the welding carriage of FIGURES 2 to 6;

FIGURE 8 is a section on the line 8—8 of FIGURE 7;

FIGURES 9 and 10 are front elevational views of an alternative form of welding apparatus embodying the invention;

FIGURE 11 is a side elevation of the apparatus of FIGURES 9 and 10;

FIGURE 12 is an enlarged partial elevation of the ring and carriage of FIGURES 9 to 11;

FIGURES 13 and 14 are sections on the line 13—13 and 14—14, respectively, of FIGURE 12;

FIGURE 15 is a disassembled perspective view of the supporting means for the carriage of FIGURES 9 through 14;

FIGURE 16 is an elevational view similar to FIGURE 12 of an alternative construction of the supporting ring;

FIGURE 17 is a perspective view of still another form of welding apparatus embodying the invention;

FIGURE 18 is an elevation of the apparatus of FIGURE 17 with the pipe shown in section;

FIGURE 19 is an axial section of the apparatus of FIGURES 17 and 18 taken on the line 19—19 of FIGURE 20; and FIGURE 20 is a transverse section taken on the line 20—20 of FIGURE 19.

FIGURE 1 illustrates generally a typical pipe laying operation according to which a series of pipe sections 10, which may be of any conventional diameter and length, are laid together in a string on pallets or shoring 11. Generally, the pallets or shoring are placed beside a ditch in which the pipe is to be buried. As the sections are laid end-to-end the joints between adjacent sections, as shown at 12, and which are preferably defined by bevels at the ends of the sections, are welded as indicated at 13 to secure the pipe sections together in fluid-tight relationship with each other. After the sections are welded they are progressively laid or pushed into the ditch and are covered with earth to complete the pipe line installation.

The present invention relates to apparatus for automatically or semi-automatically forming the welds 13 between adjacent pipe sections which operation has heretofore been commonly performed by hand. As shown in FIGURE 2, the entire apparatus and all supplies of power required therefor may be carried by a conventional truck 14 which may be driven along beside the pipe string to bring the welding apparatus to the different joints in the pipe successively to perform the welding operation. The truck preferably carries a crane having a boom 15 controlled by hydraulic cylinder 16 for supporting and carrying the actual welding apparatus and positioning it properly on the pipe string. In addition, the truck may carry a source 17 of welding current, a hydraulic pump 18 driven by an electric motor 19 to supply operating fluid to the welding apparatus and a tank 21, or similar source of an inert gas, to blanket the weld during the operation.

The actual welding apparatus comprises an annular support, indicated generally at 22, which encircles the pipe at a joint between the pipe sections and a carriage, indicated generally at 23, carried by the support and movable around the pipe to weld the joint. The carriage 23 carries a welding gun 24 which is connected to one of a pair of electric cables 25 extending from the source 17, the other cable being grounded to the pipe to complete the welding circuit. A flexible hose or conduit 26 conducts inert gas to the gun and similar flexible hoses or conduits 27 constitute supply and return lines for hydraulic operating fluid. These lines are preferably connected to the pump 18 through a reversing valve 28 so that the direction of operation of the hydraulic motor on the carriage may be reversed, as required.

The gun 24, as illustrated diagrammatically in FIGURE 2a, comprises an outer tubular shell or nozzle tapered at one end, as indicated at 29, to a discharge orifice facing toward the pipe. A sleeve 31 extends through the tubular nozzle and is of a size to receive and pass a welding rod or wire 32. One of the cables 25 may be connected to the nozzle housing, as shown, to supply welding current to the welding rod through the housing and sleeve 31, it being understood that the nozzle will be mounted in electrically insulated relationship to the carriage so that the welding current will not be short circuited. The conduit 26 for inert gas is connected to a nipple 33 on the nozzle to flow through the space around the sleeve 31 and to be discharged around the projecting tip of the welding rod so that it will blanket the area being welded.

The annular support 22 in the form shown in FIGURES 1 to 8 is in the form of a flexible tension element encircling the pipe and holding the carriage against the pipe. As shown, the support 22 is defined by a flexible chain having a plurality of links 34 connected together by pivot pins 35, as best seen in FIGURE 6, on which rollers 36 are rotatably supported. The length of the segmented flexing chain 22 is great enough to cause rollers 36 to engage at least one-half of the periphery of the conduit. The end links 34 connect to a pair of relatively longer carriage-connecting links 34a. The rollers 36 will ride on the outer surface of the pipe and will enable the flexible annular support to move around the pipe freely.

At one point in its length the chain is provided with a detachable locking coupling, as best shown in FIGURES 5 and 6. As illustrated, this coupling comprises an overcenter locking split link means that includes a first part 37 pivoted at one end on the adjacent pivot pin 35 and at its other end to an intermediate part 37a by pin 37b. The intermediate part 37a in turn is pivoted on pins 37c to a bifurcated link part 38 which is formed with angular notches 41 to releasably receive the next adjacent pivot pin 35a in the manner shown in FIGURES 5 and 6, thereby to connect the ends of the chain together. The intermediate part 37a is provided with a manual control part 39 by means of which the part 37a may be swung to an over-center locking position, as seen in FIGURE 5, where the axis of pins 37c is located radially inwardly of the axis of pin 37b.

It will be understood that the chain is so formed that additional links may be added thereto or links may be removed therefrom to adjust the chain to the size of pipe to be welded. Thus, for a relatively small pipe, on the order of a 36 inch conduit, as shown in FIGURE 3, a relatively small number of links may be employed while for a large conduit, such as a 108 inch conduit, as shown in FIGURE 4, the chain may be extended by adding links thereto so that in either case it will properly fit around the conduit.

The carriage 23, as best seen in FIGURES 7 and 8, comprises a supporting framework having a vertical side flange 42, end flanges 43 and a bottom flange 44 which is notched out, as shown, centrally of the length of the carriage to leave a space in which the welding operation can be performed. The carriage is supported on wheels 45 carried on axles 46 adjacent to the ends of the carriage and which engage the pipe to enable the carriage to be moved freely around it. The ends of the carriage frame are connected to chain links 34a, as shown in FIGURE 7, so that the chain will hold the carriage closely adjacent to the pipe as it travels around it. The welding gun 24 is supported by a bracket 47 secured to and projecting from the side wall 42 of the carriage frame. The bracket projects sufficiently far so that the gun will extend into the cutout in the bottom wall 44 and will be positioned with its tip adjacent to and properly spaced from the pipe joint to perform an efficient welding operation.

As shown in FIGURE 7, the other of the flexible cables 25 is connected directly to the carriage frame and may be grounded to the pipe through the carriage frame. Preferably, however, the grounding to the pipe is effected through a guide roller 48 having a V-shaped periphery to fit into the V-shaped joint 12 between adjacent pipe sections. The roller is supported on an arm 49 pivoted on brackets 51 on the frame base 44 and is preferably spring-urged into contact with the pipe joint. In this way, the roller will not only provide an efficient electrical connection to the pipe to complete the welding circuit, but will also guide the carriage accurately in alignment with the pipe joint as the carriage travels around the pipe so that the joint will be accurately welded by the welding gun.

The carriage is driven by power means mounted thereon and supplied with power from the truck. As shown, the power means is in the form of a fluid motor 52 which is illustrated in FIGURE 8 as a gear motor having spaced ports 53 connected respectively to the flexible conduits 27 to receive operating liquid under pressure from the pump 18 and to return the liquid to the pump. By reversing the valve 28 the direction of fluid flow through the motor can be reversed so that the direction of travel of the carriage around the pipe can be controlled. It will be noted in this connection that in forming the weld the carriage must travel completely around the pipe pulling the flexible conduits and electrical leads with it and that it must then be reversed in order that the support and carriage can easily be removed from the pipe to be carried to the next joint to be welded.

For driving the carriage, one of the gears of the gear motor 52 is connected through a coupling 54 to a worm 55 of a worm gear reducer. The worm 55 meshes with a worm gear 56 which is secured to one of the axles 46 so that when the motor is operated the axle will be driven to turn the wheels 45 and move the carriage around the pipe. While the wheels 45 may take any desired form, they are preferably provided with pneumatic tires so that they will grip the pipe and will move the carriage around it without slippage.

The welding rod or wire may be supplied to the gun from a source of supply carried by the carriage itself. As shown, a reel or spool 57 is rotatably mounted adjacent to one end of the carriage on the side plate 42 thereof and may carry an adequate supply of welding rod or wire to form several complete joints. The welding rod or wire from the spool passes from the bottom thereof into a feeding unit 58 which is connected to the fluid motor 52 to be driven thereby. The feeding unit 58 may be a conventional form of device which is preferably adjustable to adjust the rate of welding rod feed and which will draw the rod from the reel or spool and force it out of the unit as it is driven. The rod leaving the unit 58 travels through a curved guide unit 59 into the welding gun 24 so that the welding rod will be supplied to the gun at a proper rate for effecting the weld as the carriage travels around the pipe.

In using the apparatus as so far described the carriage with the supporting chain connected thereto, but not clamped to the conduit, may be picked up by the crane through an eye 61 connected to the carriage to receive a hook carried by a chain 62 on the crane. The carriage may be moved along the pipe by the crane as the truck 14 is driven along beside the pipe until the carriage 23 is positioned approximately at a joint to be welded. At this time, the carriage may be lowered onto the pipe by the crane and may be positioned by engaging the guide wheel 48 in the joint. The free ends of the chain 22 may then be connected by engaging the openings 41 in the link section 38 with the adjacent pivot 35a, and then clamping the carriage and chain to the conduit by swinging link part 37a to the locking over-center position. When this has been done the supporting hook on the crane is disconnected from the carriage and the apparatus is ready for use to weld the joint.

With welding current being supplied from the unit 17 and with inert gas, such for example as $CO_2$, being supplied from the source 21 the valve 28 may be adjusted to drive the carriage around the pipe in a direction from right to left, as seen in FIGURE 7. At this time, the feed unit 58 will feed welding rod 32 into the gun and the welding rod will project slightly beyond the gun nozzle, as shown in FIGURE 2a, until it is the proper distance from the pipe to produce a welding arc. At this time, an arc will be struck and the pipe joint will be welded progressively around the pipe as the carriage travels around it. At the same time, the inert gas discharged from the gun will flow around the projecting end of the welding rod and will blanket the area being welded so that a good weld can be formed without the use of any additional flux. It will be noted that this operation is effective regardless of the angle of the welding gun so that the pipe can be welded completely throughout its circumference even though the welding gun is upside down while welding the lower portion of the pipe. Upon completion of the weld the carriage may be reversed by reversing the valve 28, the supply of inert gas and of welding current being shut off at this time and may be returned to a position near the top part of the pipe. When it is in this position the crane hook may be reengaged with the eye 61 and the supporting chain may be unlatched so that the carriage and chain can be lifted from the pipe by the crane and moved to the next joint to be welded.

It will be seen that once the carriage and its support are properly positioned adjacent to a joint the welding operation proceeds automatically until the joint has been completely welded. This operation can be performed much more rapidly and efficiently than hand welding and will tend to result in a more uniform weld.

FIGURES 9 through 15 illustrate another form of the invention in which the support and carriage are mounted on a straddle truck which straddles the pipe while it is supported on the pallets or shoring. As shown in FIGURES 9 to 11, the truck comprises an upper truck body 63 which may carry the engine for the truck and through which the wheels may be steered by means of a steering wheel 64. The necessary apparatus for carrying out the welding operation, such as the pump 18 and its driving motor, the welding current source 17 and the source of inert gas 21, as shown in FIGURE 2, may also be carried on the truck body. The truck body is supported on front steerable wheels 65 and rear driving wheels 66 which are carried on vertically extending frames 67. The frames 67 are of sufficient height and are spaced sufficiently from each other to span the pipe, as indicated at 10, so that the truck can straddle the pipe and can move along it as it is supported on the pallets or shoring 11.

At its front, the truck carries an outwardly projecting bracket 68 supporting a hydraulic motor 69 whose ram or piston rod 71 projects vertically downward and is movable vertically. The welding apparatus is carried by the piston rod 71 and may be moved vertically to bring the welding apparatus into welding position relative to the pipe or elevated to carry the welding apparatus over the pipe from one joint to the next.

In this construction, the welding apparatus is in the form of a rigid ring defined by two semi-circular segments 72 which are hinged to the lower end of the piston rod 71 on an axis 73. A fluid motor 74, such as a hydraulic cylinder, is connected to the segments 72 adjacent the closed sides of said segments to swing them apart, as shown in FIGURE 9, so that they can move over the pipe or to swing them together, as shown in FIGURE 10, so that they close about the pipe in closely fitting relation thereto. A carriage, indicated generally at 75, is mounted on the open side of the ring support, opposite to the side which carries motor 74, to move therearound and thereby around the pipe 10 to perform a welding operation.

As best seen in FIGURES 12 to 14, each of the segments 72 is of channel section with inwardly turned flanges 76 at its open side. The carriage 75 is formed, as seen in FIGURE 15, of two arcuately curved strips 77 and 78 which are secured together by bolts or the like in their assembled position. The strip 77 is defined with a narrow projecting portion or spacer 77a which fits against the strip 78, as shown in FIGURES 13 and 14, to define, at the opposite arcuate edges of the assemblage, outwardly facing channels into which the flanges 76 of the segments 72 are received. Preferably, the surfaces defining the channels are faced with anti-friction material, as shown at 79, so that the carriage plates can slide freely on the flanges 76 of the ring segments to move around the pipe.

The plate 78 carries on its outer surface a welding gun 81 which may be similar to the gun of FIGURES 1 to 8 and which is supplied with welding rod, welding current and an inert gas in the same manner through flexible conduits or leads, not shown, extending from the supply sources for such materials on the straddle truck. The welding rod or wire, as shown, is carried by a reel 82 supported on a bracket from the plate 78 with the wire or rod being fed therefrom through a feeding device 83, similar to the feeding device 58 of FIGURE 7 and through a suitable guide conduit into the welding gun.

The carriage is driven around the segmented ring and the wire feed device 83 is driven by a fluid motor 84 which may be a gear motor similar to that shown at 52 in FIGURE 8. The shaft of one of the gears is connected to the wire feed device 83 and also carries a worm 85 meshing with a worm gear 86. The worm gear is mounted on a shaft 87 journalled in the plates 77 and 78 and in a housing for the worm and worm gear and carries a pinion 88 within and adjacent to the web of the channel-shaped ring segments 72. The pinion meshes with an annular gear 89 rigidly mounted in the annular segmented ring and extending completely around the ring. It will be understood that at the point where the ring segments come together the annular gear is cut so that when the segments are closed tightly together it will define a continuous toothed gear around which the pinion can move This form of the invention functions in generally the same manner as the form first described except for differences in the carrying truck and in the formation of the annular support. In using this form of device, the straddle truck is driven along the pipe until the ring is in registration with a joint in the pipe at which time the fluid motor 69 is operated to lower the segmented ring toward the pipe and the motor 74 is operated to close the segments around the pipe, as shown in FIGURE 10. With the segments in closed position and properly aligned with the joint to be welded, operating fluid may be supplied to the motor 84 to drive the pinion and the welding rod feeder 83. At the same time, welding current and inert gas will be supplied to the welding gun 81 so that as the pinion turns and slides the carriage around the annular ring, the joint in the pipe will be welded.

FIGURES 13 and 14 illustrate one further desirable feature which may be employed in connection with all the embodiments of the invention, namely the use of a relatively short annular insert 91 fitting in the ends of the pipe sections and spanning the joint therebetween. Such an insert not only assists in holding the pipe sections in accurate alignment during the welding operation, but prevents molten material from the welding rod or from the edge portions of the pipe at the joint from flowing into the pipe and forming obstructions therein. It is preferred, therefore, that when the pipe sections are assembled the short ring elements 91 be inserted therein, as shown in FIGURES 13 and 14.

FIGURE 16 illustrates a further alternative construction of the supporting ring in which the ring is formed of three segments rather than two segments. As shown, the ring is defined by an upper central segment 92 which is pivotally connected to the lower end of the piston rod or ram 71 at its central portion and to the offset ends of which side sections 93 are pivotally connected by pivots 94. Fluid motors 95 are pivotally connected between brackets 96 on the segment 92 and brackets 97 on the segments 93 so that when the motors 95 are contracted the segments 93 will swing away from each other to an open position in which they can pass over the pipe and when the fluid motors are expanded the segments 93 will be swung toward each other to the closed position illustrated in which they closely encircle the pipe.

The annular ring support defined by the segments 92 and 93 may carry an annular gear 98 similar to the gear 89 of FIGURES 12 to 14 and which meshes with a drive pinion on the carriage 75 which may be identical to the carriage 75 of FIGURES 12 to 14. As shown, the only difference between the carriages in FIGURES 12 to 14 and in FIGURE 16 is that the fluid motor 84 is replaced by an electric motor 99 which drives the pinion meshing with the annular gear 98 and which may also drive the feeder for the welding rod.

FIGURES 17 through 20 illustrate a further embodiment of the invention which is in the form of a self-contained unit supported on and movable along the pipe itself and which need be supplied only with electric power through a flexible cable or the like in order to function. This unit, as illustrated generally in FIGURE 17, comprises a main carriage having a flat base 101 with angular arms 102 extending from the sides thereof and partially over the sides of the pipe. The base 101 is supported for movement along the pipe on a driving wheel or roller 103 and an idler wheel or roller 104 adjacent to opposite ends of the base. The driving and idler rollers extend through openings in the base to engage the top of the pipe and support the carriage for longitudinal movement therealong. The driving roller 103 may be driven by an electric motor 105 through a suitable speed reducer 106 so that when the motor 105 is energized, as through a remote control, the roller 103 will be driven to advance the carriage along the pipe. The carriage also carries a pump 107 driven by an electric motor 108 which may also be controlled remotely to supply operating fluid to the welding carriage to move it around the pipe when a hydraulic motor is employed on the welding carriage, as shown in FIGURES 1 to 15. A tank 109 of inert gas may also be supported on the main carriage and connected to the welding gun through a flexible conduit, not shown, in the same manner as described above.

In order to maintain the main carriage 101 in proper centered position on top of the pipe so that it will not accidentally slide therefrom, it is provided with steerable wheels 111 in addition to the rollers 103 and 104. As shown, the steerable wheels may be rubber tired wheels rotatably mounted on brackets 112 which are connected to the extensions 102 through pivots 113. The arms 114 are rigidly secured to the brackets 112 at one end and extend rearwardly therefrom and are pivotally connected at their rear ends with steering links 115. The links 115 are connected to a plate 116 pivoted at its lower end on an upright standard 117 on the base 101 and which is provided in its upper edge with a central vertical slot. A depending weight 118 is pivoted at its upper end to the upper end of the standard 117 and depends therefrom. A pin 119 carried by the weight 118 fits into the slot in the plate 116 to control movement thereof.

When the main carriage is properly centered on the pipe and the weight 118 is hanging vertically, the pin 119 will hold the plate 116 centered and the wheels 111 will be turned so that they lie in planes radial to the pipe, as seen in FIGURE 18. If the main carriage should tend to move one direction or the other from its centered position, the weight 118 will move relative to the carriage and will turn the plate 116, the weight 118 tending at all times to remain vertical. This movement acting through the links 115 and the arms 114 will turn the wheels 111 in a direction to guide the carriage back to its properly centered position on top of the pipe. Thus, as the carriage advances along the pipe it is all times maintained accurately centered thereon so that it cannot accidentally fall from the pipe to one side or the other.

At its forward end the main carriage carries a vertical supporting plate 121 on which an annular rigid ring 122, similar to the ring shown in FIGURES 9 through 15, is supported. As shown, the ring is in the form of two segments separated at the top and bottom of the pipe and swingable toward and away from each other through hydraulic motors 123 connected to the plate 121 and to brackets 124 on the segments. This ring may be identical to that more fully disclosed in FIGURES 9 through 15, as described above, and will not be described in further detail herein. FIGURES 19 and 20 illustrate a somewhat different form of carriage than that shown in FIGURES 9 to 15 and which may be used alternatively thereto. This carriage comprises an arcuate supporting plate 125 fitting slidably in the ring segments and engaging the flanges thereof near the open sides thereof. Rollers 126 are rotatably mounted on the plate 125 and may be spaced, as shown in FIGURE 20, to roll against the radially inner and outer surfaces of the ring on the interior thereof to provide for free movement of the carriage around the ring. The plate may carry a welding gun 127 similar to the welding guns described above and lying at one side of the ring to register with a joint in the pipe, as shown in FIGURE 19. It may also carry an electric motor 128 driving a pinion 129 meshing with an annular gear 131 in the ring to move the carriage around the ring when the motor is energized. It will be understood that the carriage may also carry a supply of welding rod or wire and a feeding means therefor driven by the motor 128 similar to the corresponding parts in the preceding paragraphs.

The operation of this embodiment is similar to that of the preceding embodiments in that the main carriage will move along the pipe until the supporting ring is properly aligned with a joint to be welded. At this time, the motor 105 may be stopped and the fluid motors 123 may be expanded to close the ring around the pipe. With the parts in this position, the motor 128 may be energized to move the welding carriage around the ring, welding current and inert gas being supplied to the welding gun during this operation to complete welding of the joint. Upon completion of one weld, the supporting ring may be opened and the main carriage may be moved along the pipe to the next joint to be welded at which time the operation may be repeated.

While several embodiments of the invention have been shown and described herein, it will be understood that they are illustrative only and not to be taken as a definition of the scope of the invention, reference being had for this purpose to the appended claims.

What is claimed is:

1. Apparatus for welding pipe comprising annular supporting means to extend around a pipe at a joint between two pipe sections, a carriage carried by the supporting means and held thereby against the pipe, power means on the carriage to move it around the pipe in registration with the joint, a welding gun carried by the carriage including a nozzle aligned with the joint between the pipe sections, means to feed a welding rod through the nozzle, an electrical connection to the gun to supply welding current to the welding rod, a guide roller on the carriage engageable with the joint between the pipe sections, and an electrical connection to the guide roller to connect the pipe to the source of welding current through the guide roller.

2. Apparatus for welding pipe comprising annular supporting means to extend around a pipe at a joint between two pipe sections, a carriage carried by the supporting means and held thereby against the pipe, power means on the carriage to move it around the pipe in registration with the joint, a welding gun carried by the carriage including a nozzle aligned with the joint between the pipe sections, means to feed a welding rod through the nozzle, an electrical connection to the gun to supply welding current to the welding rod, a guide roller on the carriage engageable with the joint between the pipe sections, an electrical connection to the guide roller to connect the pipe to the source of welding current through the guide roller, and means to supply an inert gas to the nozzle to flow therefrom around the welding rod to blanket the area being welded.

3. Apparatus for welding pipe comprising annular supporting means to extend around a pipe at a joint between two pipe sections, a carriage carried by the supporting means and held thereby against the pipe, power means on the carriage to move it around the pipe in registration with the joint, a welding gun mounted on the carriage to weld the joint as the carriage moves around the pipe, a supply of welding rod carried by the carriage, feeding means on the carriage receiving welding rod from the supply and feeding it to the gun, and a driving connection from the power means to the feeding means.

4. The apparatus of claim 3 including a flexible connection to the gun to supply inert gas thereto, the gas being discharged from the gun around and along the welding rod to blanket the area being welded.

5. The apparatus of claim 4 including a flexible electrical connection to the gun to supply welding current to the welding rod.

6. Apparatus for welding pipe comprising a carriage movable around a pipe at a joint between pipe sections, a flexible tension element secured to the carriage and extending around the pipe to hold the carriage against the pipe, power means on the carriage to move it and the tension element around the pipe in registration with the joint, and a welding gun mounted on the carriage to weld the joint as the carriage moves around the pipe.

7. The apparatus of claim 6 in which the carriage and tension element carry rollers engaging the pipe to facilitate movement thereof around the pipe.

8. The apparatus of claim 6 in which the power means is a fluid motor and there are flexible fluid connections to the carriage to supply operating fluid to the motor.

9. Apparatus for welding pipe comprising a rigid annular ring to fixedly engage and totally encircle the pipe at a joint between pipe sections, said ring being formed of relatively movable arcuate segments that are hinged together and which can move apart to pass laterally over the pipe, power means connected to said movable ring segments to move the segments together or apart about the hinged connections, a carriage movable along and around the ring in registration with the joint, cooperating driving means on the carriage and the ring to move the carriage around the ring, and a welding gun on the carriage to weld the joint as the carriage moves around the ring.

10. The apparatus of claim 9 in which the ring is formed by a top segment and two side segments hinged respectively to the ends of the top segment on axes parallel to the axis of the ring, and said power means including expansible fluid motors connected to the top segment and the side segments to move the side segments about the hinges.

11. Apparatus for welding pipe at a joint between pipe sections comprising a main carriage movable along the top portion of a pipe, drive means on the carriage for moving it lengthwise of the pipe, an annular segmented support carried by the carriage, the segments of said support being movable between an open-support position, where the segments are spaced apart to permit the apparatus to move along the pipe from adjacent one pipe joint to another pipe joint, and a closed-support position, where the segments join together to encircle and engage the periphery of the pipe when the welding apparatus is adjacent a joint to be welded, a welding carriage carried by the support, power means on the welding carriage to move it along the encircling support and around the pipe, and a welding gun carried by the welding carriage to weld a joint in the pipe as it travels around the pipe.

12. The apparatus of claim 11 in which the main carriage has stabilizing wheels supporting it on the pipe at least one of which is steerable, and gravity responsive means for steering the steerable wheel in a sense to maintain the main carriage on top of the pipe.

13. The apparatus of claim 12 in which the gravity responsive means comprises a pendant weight linked directly to the steerable wheel to turn it.

14. The apparatus of claim 11 in which the power means is a fluid motor and the main carriage carries a fluid pump to supply operating fluid to the motor.

References Cited in the file of this patent

UNITED STATES PATENTS

| | | |
|---|---|---|
| 2,013,630 | Goldsborough | Sept. 3, 1935 |
| 2,795,689 | McNutt | June 11, 1957 |
| 2,960,597 | Bruno et al. | Nov. 15, 1960 |